(12) United States Patent
Walter (10) Patent No.: US 9,317,494 B2
(45) Date of Patent: Apr. 19, 2016

(54) GRAPHICAL HIERARCHY CONVERSION

(75) Inventor: Wolfgang E. Walter, Hambrucken (DE)

(73) Assignee: SAP SE, Walldorf (DE)

( * ) Notice: Subject to any disclaimer, the term of this patent is extended or adjusted under 35 U.S.C. 154(b) by 1906 days.

(21) Appl. No.: 11/732,614

(22) Filed: Apr. 3, 2007

(65) Prior Publication Data

US 2008/0250318 A1 Oct. 9, 2008

(51) Int. Cl.
*G06F 17/24* (2006.01)
*G06F 17/30* (2006.01)

(52) U.S. Cl.
CPC ............ *G06F 17/246* (2013.01); *G06F 17/245* (2013.01)

(58) Field of Classification Search
CPC ... G06F 17/246; G06F 17/245; G06F 17/247; G06F 17/30572; G06Q 10/087
USPC ................................................. 715/853–855
See application file for complete search history.

(56) References Cited

U.S. PATENT DOCUMENTS

| | | | | |
|---|---|---|---|---|
| 5,487,141 | A * | 1/1996 | Cain et al. ................... | 715/764 |
| 5,701,453 | A * | 12/1997 | Maloney et al. ............. | 707/714 |
| 5,805,881 | A * | 9/1998 | Kiuchi et al. | |
| 5,842,218 | A * | 11/1998 | Robinson ..................... | 707/102 |
| 5,870,559 | A * | 2/1999 | Leshem et al. .............. | 709/224 |
| 6,097,382 | A * | 8/2000 | Rosen et al. ................. | 715/762 |
| 6,219,053 | B1 * | 4/2001 | Tachibana et al. ........... | 715/835 |
| 6,341,310 | B1 * | 1/2002 | Leshem et al. .............. | 709/223 |
| 6,499,026 | B1 * | 12/2002 | Smith et al. ................. | 707/2 |
| 6,549,940 | B1 * | 4/2003 | Allen et al. ................. | 709/219 |
| 6,775,675 | B1 * | 8/2004 | Nwabueze ........ | G06F 17/30554 707/600 |
| 6,801,229 | B1 * | 10/2004 | Tinkler ......................... | 715/853 |
| 6,816,175 | B1 * | 11/2004 | Opalka et al. ................ | 715/854 |
| 6,941,359 | B1 * | 9/2005 | Beaudoin et al. ............ | 709/221 |
| 8,010,909 | B1 * | 8/2011 | Hanson et al. ............... | 715/853 |
| 2002/0054167 | A1 * | 5/2002 | Hugh ............................ | 345/854 |
| 2002/0065818 | A1 * | 5/2002 | Starr ............................. | 707/5 |
| 2002/0129017 | A1 * | 9/2002 | Kil et al. ....................... | 707/6 |
| 2002/0143823 | A1 * | 10/2002 | Stevens ........................ | 707/523 |
| 2002/0154177 | A1 * | 10/2002 | Barksdale et al. ........... | 345/853 |
| 2003/0061246 | A1 * | 3/2003 | Bowman et al. ............. | 707/204 |
| 2003/0112958 | A1 * | 6/2003 | Beaudoin et al. ........ | 379/221.15 |
| 2003/0120584 | A1 * | 6/2003 | Zarefoss et al. ............. | 705/37 |
| 2003/0131007 | A1 * | 7/2003 | Schirmer et al. ............ | 707/100 |
| 2003/0172078 | A1 * | 9/2003 | Stumpf ......................... | 707/100 |
| 2003/0208417 | A1 * | 11/2003 | Heinrichs et al. ............ | 705/28 |
| 2003/0218640 | A1 * | 11/2003 | Noble-Thomas ............ | 345/853 |
| 2004/0111398 | A1 * | 6/2004 | England et al. .............. | 707/3 |
| 2004/0117046 | A1 * | 6/2004 | Colle et al. .................. | 700/99 |
| 2005/0039033 | A1 * | 2/2005 | Meyers et al. ............... | 713/193 |
| 2005/0071765 | A1 * | 3/2005 | Hallisey et al. .............. | 715/734 |
| 2005/0138160 | A1 * | 6/2005 | Klein et al. .................. | 709/223 |
| 2005/0183002 | A1 * | 8/2005 | Chapus ........................ | 715/505 |
| 2005/0216504 | A1 * | 9/2005 | Delvat et al. .............. | 707/103 R |
| 2005/0284934 | A1 * | 12/2005 | Ernesti et al. ................ | 235/385 |
| 2006/0026499 | A1 * | 2/2006 | Weddle ........................ | 715/503 |

(Continued)

*Primary Examiner* — Amy Ng
*Assistant Examiner* — William Wong
(74) *Attorney, Agent, or Firm* — Dilworth IP, LLC (57) ABSTRACT

Embodiments of the invention generate a primary interface to display data in a flat format. A secondary interface is generated at the request of a user to display the same data in a tree or similar hierarchical format. The secondary interface is initiated from the primary interface. A user selects data in the secondary interface and thereby navigates to the corresponding data in the primary interface. This system improves user productivity by increasing the speed at which a user finds and interacts with stored data in the supply chain management system.

18 Claims, 7 Drawing Sheets

(56) References Cited

U.S. PATENT DOCUMENTS

| | | | |
|---|---|---|---|
| 2006/0101324 A1* | 5/2006 | Goldberg et al. | 715/503 |
| 2006/0112356 A1* | 5/2006 | McGaughy et al. | 716/3 |
| 2006/0129572 A1* | 6/2006 | Cole et al. | 707/100 |
| 2006/0225000 A1* | 10/2006 | Albrecht et al. | 715/853 |
| 2006/0248070 A1* | 11/2006 | Dejean et al. | 707/5 |
| 2007/0067458 A1* | 3/2007 | Chand | 709/226 |
| 2007/0078862 A1* | 4/2007 | Chand et al. | 707/100 |
| 2007/0198912 A1* | 8/2007 | Meunier | 715/509 |
| 2007/0300173 A1* | 12/2007 | Woods | 715/769 |
| 2008/0276162 A1* | 11/2008 | Birdwell | G06F 17/246 715/227 |

\* cited by examiner

FIG. 6

GRAPHICAL HIERARCHY CONVERSION

BACKGROUND

1. Field of the Invention

The invention relates to logistics and supply chain management. Specifically, the invention relates to the presentation of data in a supply chain management application user interface.

2. Background

Logistics often involves the transportation of goods and services from a source location to a destination location. The transportation services for this movement of goods and services are provided by transportation services providers (e.g., DHL or UPS), a manufacturer, retailer, distributor or similar entity. The transportation of goods and services is often employed in the process of supply chain management.

A supply chain is a network of retailers, distributors, transportation service providers, warehouses, and suppliers that take part in the production, delivery and sale of a product or service. Supply chain management is the process of coordinating the movement of the product, information related to the product and money among the constituent parts of a supply chain. Supply chain management also integrates and manages key processes along the supply chain. Supply chain management strategies often involve the use of software to project and fulfill demand and improve production levels.

These software applications present the supply chain management data in document driven user interfaces. The document driven user interfaces often display data in a flat table format. This type of display of data is utilized because it is simple to implement, because it matches the database representation of the data. However, this type of display of data is difficult for a user to understand. The user must have a deep understanding or extensive experience with the user interface or the data to understand the presentation of large and complex data sets.

If hierarchy data is available that represents the relationships between data, this hierarchy data is displayed in separate tables through the same user interface. Each hierarchy table displays information in a flat format. The flat presentation of hierarchy data does not assist a user in the process of understanding the data or relationships between sets of data.

SUMMARY

Embodiments of the invention generate a primary interface to display data in a flat format. A secondary interface is generated at the request of a user to display the same data in a tree or similar hierarchical format. The secondary interface is initiated from the primary interface. A user selects data in the secondary interface and thereby navigate to the corresponding data in the primary interface. This system improves user productivity by increasing the speed at which a user finds and interacts with stored data in the supply chain management system.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
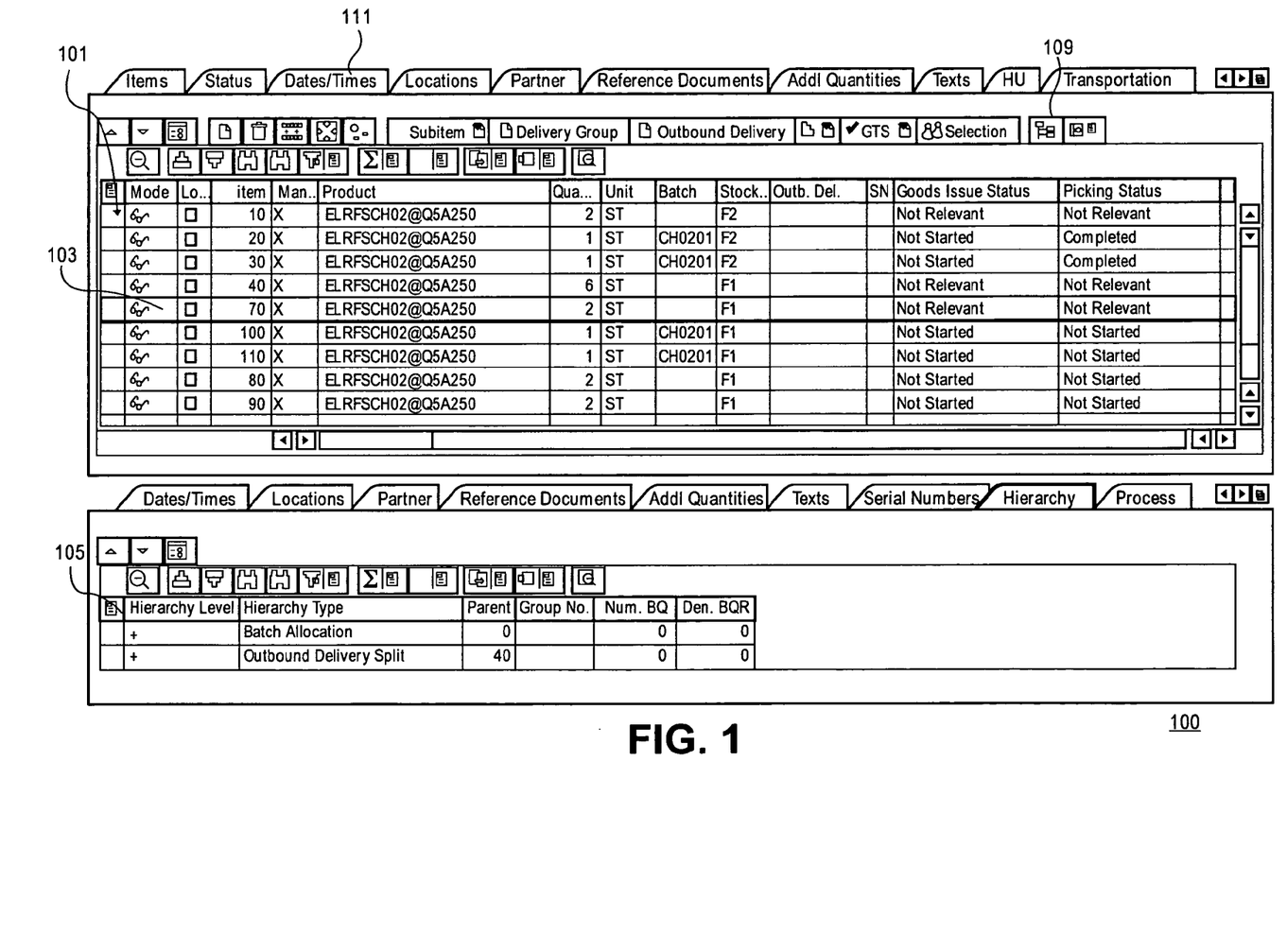
FIG. 1 is a diagram of one embodiment of a primary user interface to display data to a user.

FIG. 1 is a diagram of one embodiment of a primary user interface to display data to a user. In one embodiment, a primary user interface 100 displays data in a flat format. A flat format can be a table, listing, prose text or similar display of data. The flat format displays only basic relationships between data including identity and a general non-specific relationship. The flat format does not display data in a format that indicates a hierarchical relationship. Rather, hierarchical data is displayed only in a flat table. As a result, a user must labor or have extensive knowledge of the data or the system to appreciate the relationships amongst the displayed data.

In one embodiment, the primary user interface 100 presents any number of tables or similar flat presentations of data. In one example, a first table 101 and a second table 105 are displayed through the primary user interface 100. The first table 101 and second table 105 each display related data. For example, the data in the second table may be related to the data in row 103 of the first table 101. The columns of each table indicate a type or label for the data in that column. In the example embodiment, a different product is listed in each row along with information about the product such as quantity, stock information, shipment information and similar information about that product. The information about each product is organized into columns with similar information about each product placed in the same column.

In the second table 105, information about a hierarchy of information is presented. The second table 105 indicates the types of hierarchy that exist, the level of hierarchy and similar hierarchy information in a flat table format. The hierarchy information can be displayed in multiple tables. Any number and combination of tables can be displayed and the display of tables can be tabbed 111, layered or windowed within the primary user interface 100.

The primary user interface 100 also includes an option 109 for activating the display of data through a second user interface. The option can be a button, menu item, hot key or similar activation mechanism. In another embodiment, a second user interface is generated automatically when needed. The second user interface can be disabled or dosed using the option.

Figure 2A:
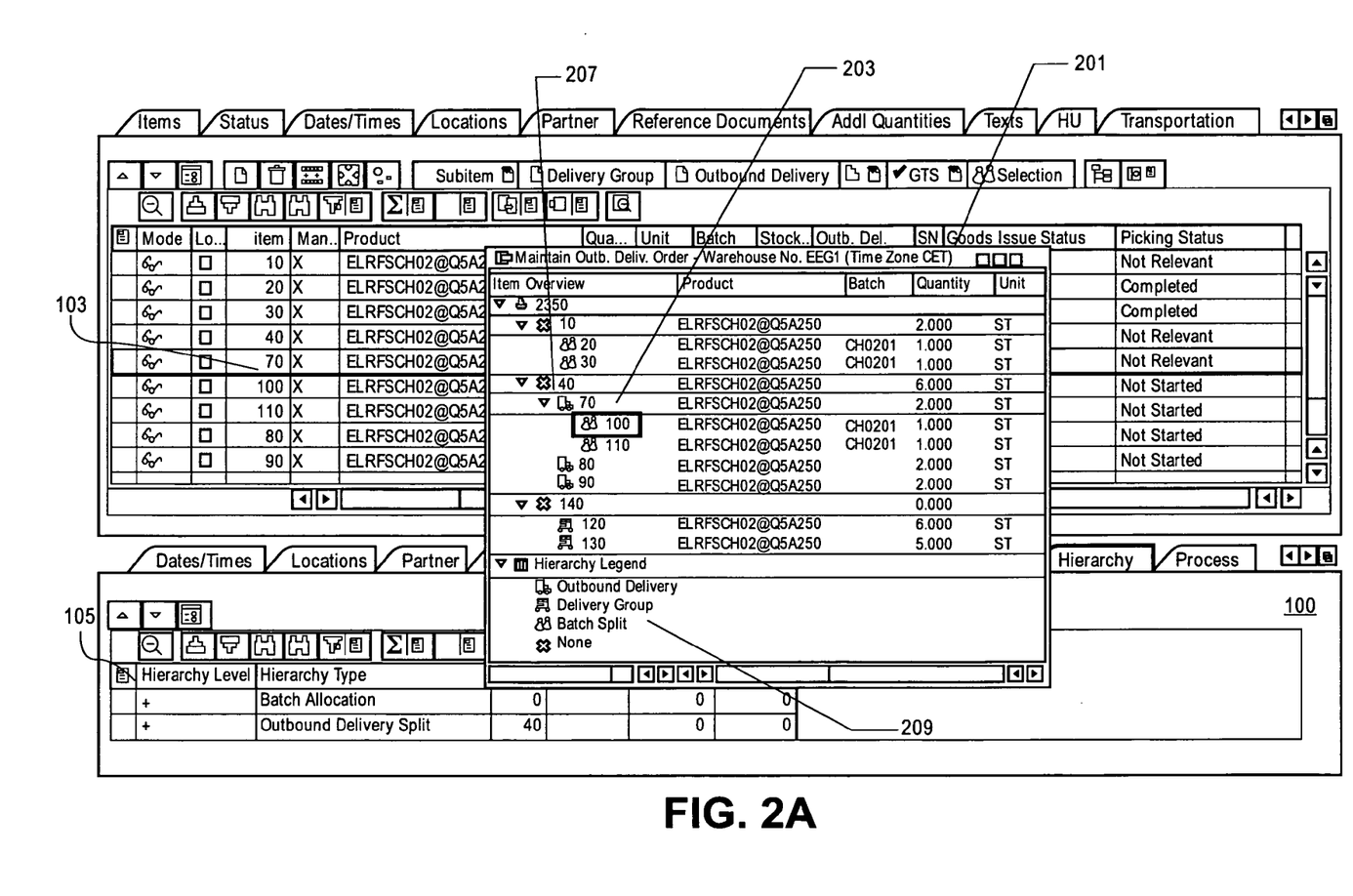
FIG. 2A is a diagram of one embodiment of a primary and secondary user interface to display data to a user.

FIG. 2A is a diagram of one embodiment of a primary 100 and secondary 201 user interface to display data to a user. In one embodiment, the secondary user interface 201 can be a pop-op window, overlay window or similar type of user interface mechanism. In one embodiment, the secondary user interface 201 is generated automatically in response to a selection of a data item, row or column of the primary user interface 100. The secondary user interface 201 is generated and positioned automatically. The secondary user interface 201 is automatically positioned to prevent the obscuring of related data in the primary user interface. In another embodiment, the secondary user interface 201 is generated in response to a user selection of a corresponding user interface element such as an icon, menu item or similar user interface element. The secondary user interface 201 is positioned by the user selecting a location or preference for location.

The secondary user interface 201 can be resized or repositioned by a user after generation. The secondary user interface 201 is positioned and sized independent of the primary user interface 100 or restricted by the size and characteristics of the primary user interface 100. The secondary user interface 201 can be displayed through a primary user display device such as a monitor or television or through a secondary display device such as a separate monitor or television, a handheld device or similar display device. The secondary user interface 201 can be displayed on a device other than that which displays the primary user interface 100.

The secondary user interface 201 displays data in a hierarchical format such as a tree format, nested format or similar format. The secondary user interface 201 displays data selected in the primary user interface 100 or related to the data selected in the primary user interface 100 in a hierarchical format. In one embodiment, the data selected in the primary user interface 100 can be highlighted 203 or similarly identified in the secondary user interface 201. The hierarchical data corresponding to the data selected in the primary user interface 100 is automatically accessed and analyzed to generate the hierarchical display.

In one example embodiment, the format of the secondary user interface 201 is a tree display where each lower level of the tree is displayed as further indented and layers of the tree are optionally hidden or displayed by user selection of buttons, arrows or similar user interface options. Each layer, row or type of data is also given an identifying icon 207 according to its type or similar qualities or characteristics. A legend 209 is displayed within the secondary user interface 201. The legend 209 provides a description or similarly identifies each of the icons displayed. This allows easy and intuitive use of the secondary user interface 201 by any user.

Figure 2B:
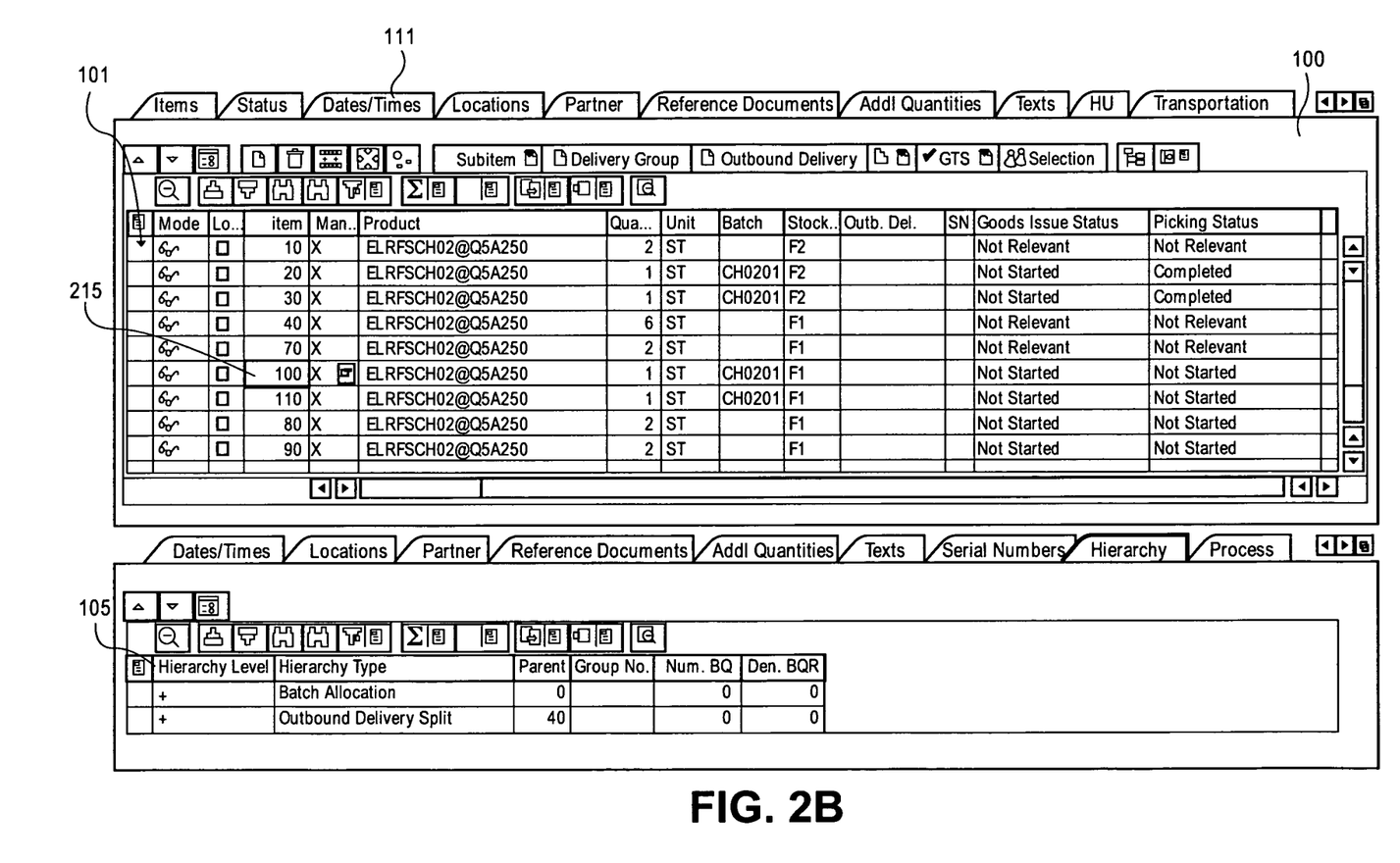
FIG. 2B is a diagram of one embodiment of a primary user interface with data selected from the secondary user interface.

The secondary user interface 201 can also be used to navigate data in the primary user interface 100. A user selects or highlights 203 data in the secondary user interface 201 to find that data or corresponding data in the primary user interface 100. FIG. 2B is a diagram of one embodiment of a primary user interface 100 with data selected from the secondary user interface 201. In this example, the primary user interface 100 displays data in two flat tables 101, 105. Upon selection of data in the secondary user interface, the secondary user interface can be closed or minimized and navigation of data automatically returns to the primary user interface 100. In another embodiment, the secondary user interface remains open and dynamically updates as the user selects data in the primary user interface 100. The secondary user interface updates to show the hierarchy of data selected in the primary user interface 100 or data related to the selected data.

If data is selected in the secondary user interface, then matching or related data is highlighted or similarly selected 215 in the primary user interface 100. For example, a row or column is highlighted in which data selected in the secondary user interface is displayed. The user can switch back and forth between the two user interfaces or can use both simultaneously.

Data can be modified, added or deleted in either the primary user interface 100 or the secondary user interface 201. Modifications, additions and deletions are affected through data fields, menus or similar user interface elements supplied by each of the interfaces. Any change made to data in the primary or secondary user interfaces is updated and displayed in the other interface. For example, if a quantity field for a good is updated in the secondary user interface, this change is automatically updated in the primary user interface. Similarly, any fields, hierarchy or similar aspects of the user interfaces and data that are dependent on the changed data can be updated automatically.

In a further embodiment, additional user interfaces are generated and multiple user interfaces can be generated and displayed concurrently. Any combination of primary and secondary user interfaces can be displayed and utilized. For example, a user selects multiple items in a primary user interface presenting data in a flat format. Multiple secondary user interfaces are generated to display each of the items selected in their respective hierarchical context.

Figure 3:
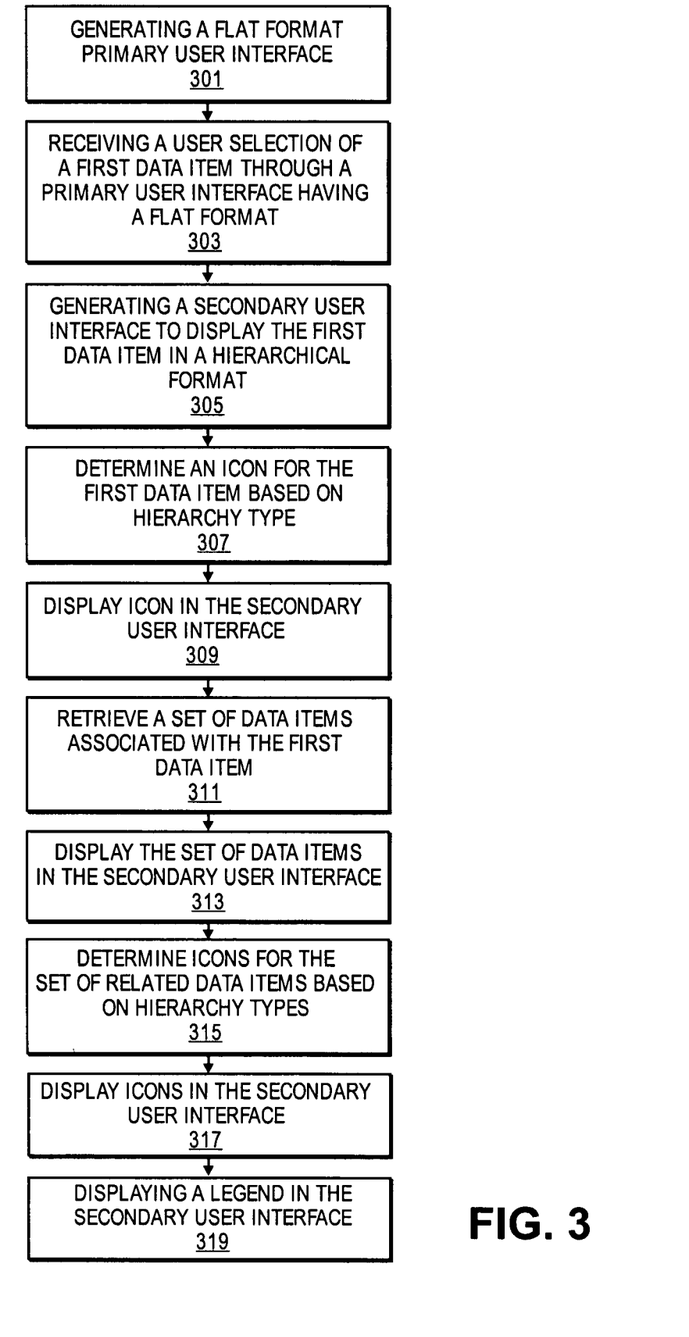
FIG. 3 is diagram of one embodiment of process for generating a secondary user interface.

FIG. 3 is diagram of one embodiment of process for generating a secondary user interface. In one embodiment, the process is initiated after the creation of a primary or first user interface (block 301). The primary user interface is generated upon access, initialization or startup by a user of an application such as a supply chain management application, upon system start up of the machine or server executing the application or through a similar process. The primary user interface is generated by the application or a user interface module that is associated with the application or an application server.

The user selects data in the primary user interface using a peripheral input device such as a mouse, keyboard or similar input mechanism using known interface navigation mechanisms (block 303). In another embodiment, a default data item is selected and a user can select at any time a different or another data item. In one embodiment, once a data item has been selected in the primary user interface then a navigation option for activating the secondary user interface becomes available. In another embodiment, the secondary user interface is automatically generated upon selection of a data item or is generated at start up with a default data item selected in the primary user interface.

A user selects the navigation option to generate the secondary user interface. In response to the selection of a navigation option, the secondary user interface is generated as a pop-up, overlay, or similar user interface. The secondary user interface displays the selected data in a hierarchical context using a tree type display, nested display type or similar hierarchical data representation (block 305). The process of generation of the secondary user interface retrieves the data selected through the primary user interface and identifies an icon for the data item and a place in the hierarchy (block 307). The icon is determined based on the hierarchy type or level, data item type, or similar characteristics of the data.

In one embodiment, the secondary user interface begins to draw the hierarchy as data hierarchy is determined or after the hierarchy of relevant data is determined. The icon of the first data item is displayed along with the data in the secondary user interface (block 309). The process then retrieves data related to the first data item based on hierarchical relationships, which are stored in separate tables or similar data structures from the selected data items and displayed in a separate section of the primary user interface (block 311). In another embodiment, the tracing of hierarchical relationships is completed or exhausted prior to displaying any icons or data in the secondary user interface. Any searching or traversing algorithm can be utilized to determine related data such, specifically, the algorithm can be used to traverse hierarchy data associated with the selected data item to find parent and children data items to be added to the secondary user interface. Each of the retrieved related data items are displayed in the secondary user interface in accord with their hierarchy level or characteristics (block 313). A limit can be placed on the amount of data, the number of hierarchy levels or scope of hierarchy levels to be displayed concurrently based on user preferences, secondary user interface characteristics such as size and similar constraints.

For each of the data items displayed in the hierarchical representation of the secondary user interface an icon is determined for display with each data item (block 315). Any algorithm can be used to map the icons to the data to be displayed. The icon is determined based on the hierarchy level or other data characteristics of a data item displayed in the secondary interface. In a further embodiment, the icon information is stored in the database and retrieved along with each data item, rather than being derived from the type and characteristics of the data item. After the proper icon has been determined it is drawn or displayed with the data item (block 317).

A legend identifying or providing information for each of the icons displayed is generated and displayed (block 319). In one embodiment, the legend is predetermined and retrieved from a data store for display or coded into the secondary user interface. In another embodiment, the legend is dynamically generated, by identifying those icons that are currently displayed or that were retrieved for the generation of the secondary user interface and determine identifying information from context or similar data.

In a further embodiment, a legend is not displayed in the secondary user interface. In place of the legend, a mouse over or similar input reveals information about an icon or data item in a further pop up text box or similar user interface element.

Figure 4:
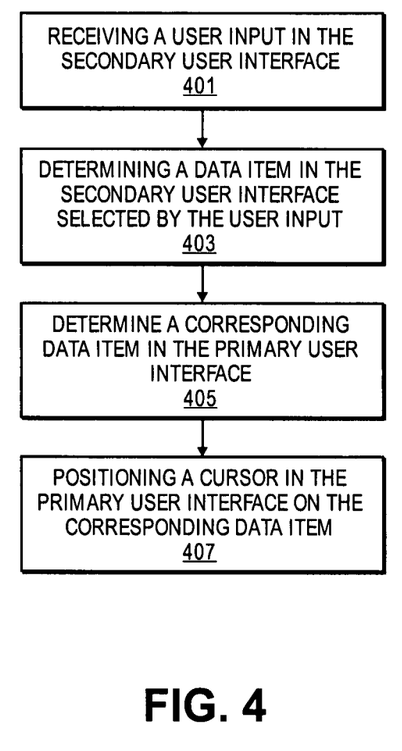
FIG. 4 is a diagram of one embodiment of a process for navigating data in the primary interface using the secondary interface.

FIG. 4 is a diagram of one embodiment of a process for managing the navigation of data in the primary user interface using the secondary user interface. In one embodiment, after a secondary user interface has been generated a user interacts with the secondary user interface to access or find data in the primary user interface. This process can be initiated by a user selecting data in the secondary user interface (block 401). The user can select the data using any input device, navigation mechanism or algorithm.

If the secondary user interface receives a data selection then the secondary user interface determines the data item selected (block 403). The data item selected can have an associated unique identifier, key or similar identifier to allow the secondary user interface to locate the data item and associated data items in a database or similar data store. The unique identifier or similar indicator can be used to locate the corresponding data in the primary user interface (block 405). The unique identifier or similar data is sent to the primary user interface using any type of messaging or remote procedure calling mechanism. A cursor, highlight, or similar marker or indicator is placed on the corresponding data by the primary user interface in response to receiving the indicator (block 407). In another embodiment, the secondary user interface receives input and automatically modifies the primary user interface, directly.

In one embodiment, after a selection is made and marked in the primary user interface, focus shifts from the secondary user interface to the primary user interface. The window, tab or similar user interface mechanisms encompassing the primary user interface and secondary user interface have a focus indicating which interface receives user input. In one embodiment, the secondary user interface closes or is minimized after focus shifts to the primary user interface.

One skilled in the art would understand that a similar process is used to update and highlight data items in a secondary user interface based on navigation of the primary user interface. Similarly, any number of user interfaces can interact employing the same principles discussed in this example.

Figure 5:
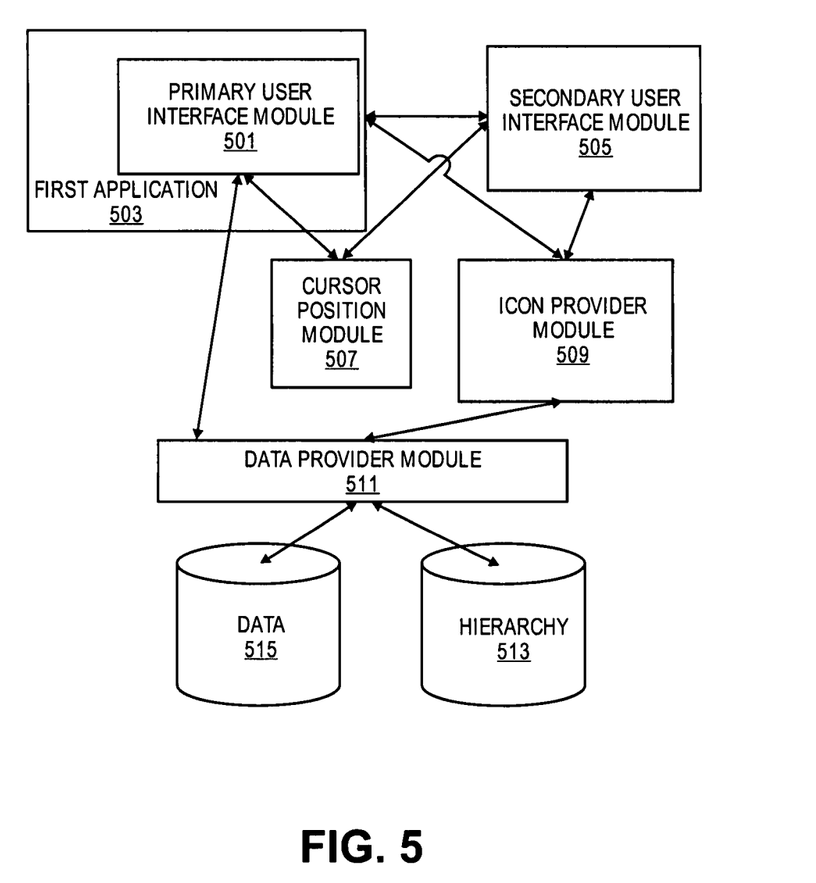
FIG. 5 is a diagram of one embodiment of the user interface generation system.

FIG. 5 is a diagram of one embodiment of the user interface generation system. In one embodiment, an application 503 provides a first or primary user interface 501. The primary user interface module 501 is a component of the application 503 or is a separate component. The primary user interface 501 provides access to the services and functionality of the application 503 to users. In another embodiment, the application 503 and primary user interface are provided by an application server.

In one embodiment, the application 503 also interacts with a secondary user interface module 505. The secondary user interface 505 is a component of an application 503 or is a separate component. In one embodiment, the secondary user interface module 505 is utilized to generate secondary user interfaces for multiple applications and their respective primary user interface module. The secondary user interface module 505, in this embodiment, is a general utility or component available to any application in the system. This allows the secondary user interface module 505 to be an add-on to many applications without having to program specialized modules or components to provide the secondary user interface service within each application or significantly modify the application.

The application 503, primary user interface 501 and secondary user interface module 505 interact with a cursor positioning module 507. The cursor positioning module 507 receives user input from a peripheral device such as a mouse or keyboard and position a cursor within a primary user interface 501 or secondary user interface 505. The cursor positioning module 507 draws a cursor or pointer or provides positioning information to the module or program responsible for drawing or rending the primary user interface or secondary user interface.

In one embodiment, the application 503 and primary user interface 501 accesses a data provider module 511. The data provider module 511 manages data retrieval and storage requests bound for a data store 515 or hierarchy storage 513. These components are part of a database management system, a file management system or similar data management system. The data store 515 can be any database system for storing the supply chain management data or similar data. The hierarchy store 513 can be any database system, file or similar data storage repository to track characteristics of the hierarchy for a selected data item.

In one embodiment, the system includes an icon provider module 509. The icon provider module 509 includes hard or soft coding for icons that represent defined hierarchy levels or data items with defined parameters. The soft coded icon provider module 509 is updated by a local application, remote application, user or similar entity. In another embodiment, the icon provider 509 determines icons by retrieving icon identification information from the data store 515 or hierarchy store 513 through the data provider module 511. Each data item identifies a corresponding icon through a stored parameter.

Figure 6:
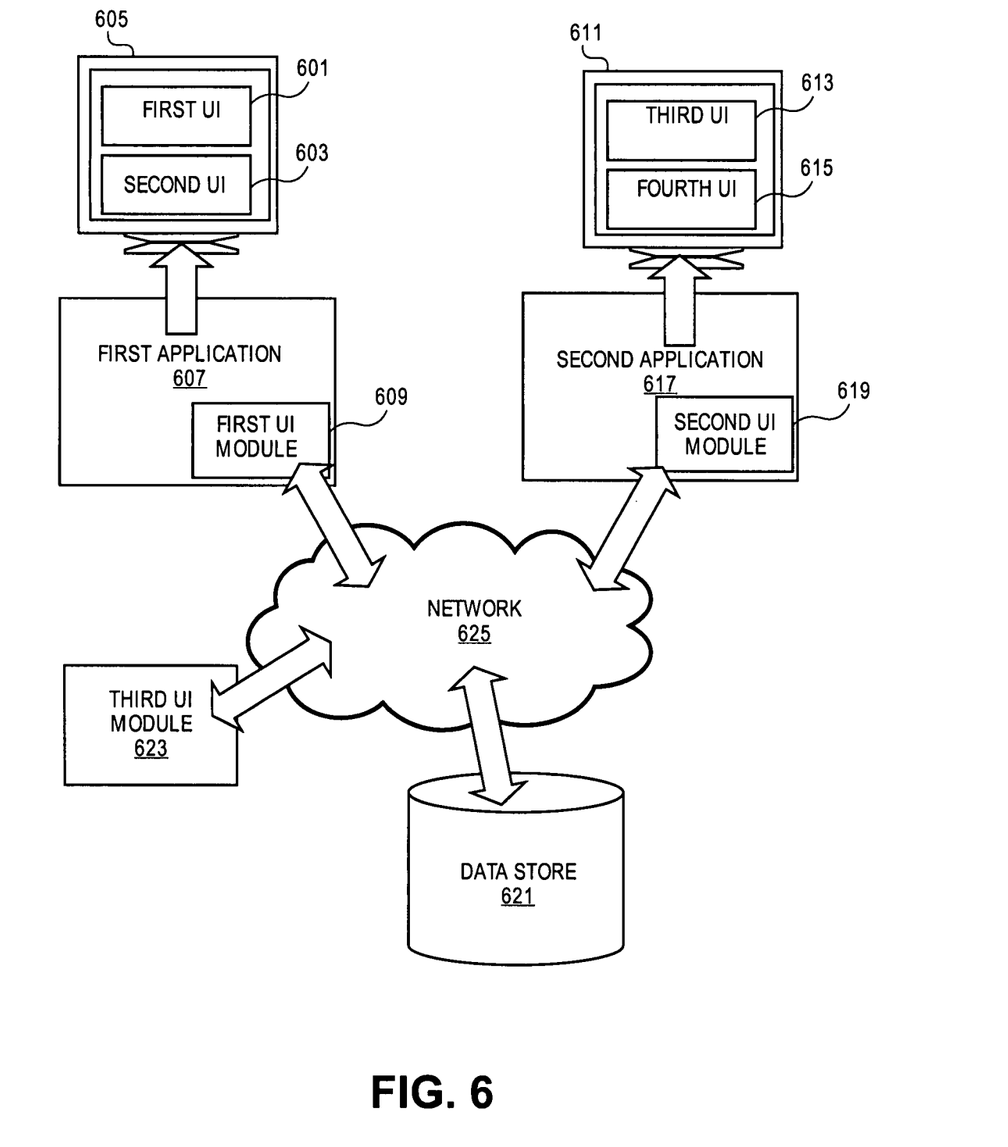
FIG. 6 is a diagram of one embodiment of a remote user interface system.

FIG. 6 is a diagram of one embodiment of a remote user interface system. In one embodiment, the provider of a secondary user interface is remote from any application generating a primary user interface. For example, a first application 607 has a first user interface module 609 that generates a first or primary user interface 601 on a local machine 605. The first application 607 communicates across a network 625 with a third user interface module 623. The third user interface module 623 provides a second user interface 603 on the local machine 605.

A second application 617 in the system has its own native or primary user interface or user interface module 619. This second primary user interface module 619 generates a third user interface 613 on the local machine 611. The second application 617 also utilizes a remote third user interface module 623 across a network 625 to generate a fourth user interface 615 on the local machine 611.

In one embodiment, the system includes a data store 621 that stores data to be requested by applications such as supply chain management data. The data store 621 or another data store can also contain icon data, icon identification data related to a data item or similar information. In this embodiment, each data item has a reference to a corresponding icon. The icons can be stored separately, coded into the icon provider module or stored with the corresponding data item.

In one embodiment, the user interface system including the secondary user interface module is implemented as a set of hardware devices. In another embodiment, these components are implemented in software (e.g., microcode, assembly language or higher level languages). These software implementations can be stored on a machine-readable medium. A "machine readable" medium may include any medium that can store information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method for presentation of data in a supply chain management system comprising:
   receiving a user input through a supply chain management application user interface, the supply chain management application user interface generated by a user interface module of a supply chain management application to display data including a plurality of data items in a flat table format, the plurality of data items having a hierarchical relationship, and to provide access to services and functionality of the supply chain management application;
   retrieving hierarchical relationship data associated with the data, the hierarchical relationship data displayed in a flat table format separate from the display of the data in the supply chain management application user interface, the hierarchical relationship data stored in a data structure separate from the data; and
   generating a second user interface by a computer system to display the data including the plurality of data items having the hierarchical relationship in a hierarchical tree format having discrete levels in a window separate from and simultaneous with the supply chain management application user interface in response to the user input, the second user interface generated by a second user interface module for navigating and manipulating the data displayed in the supply chain management application user interface, the second user interface module being separate and remote from the supply chain management application to generate hierarchical display of data for a plurality of applications.

2. The method of claim 1, further comprising:
   receiving a second user input through the second user interface; and
   positioning a cursor in the supply chain management user interface in response to the second user input.

3. The method of claim 1, further comprising:
   obtaining an icon for a data item to display in the second user interface.

4. The method of claim 1, further comprising:
   determining a first data item corresponding to the user input; and
   retrieving a second data item related to the first data item to display in the second user interface.

5. The method of claim 1, further comprising:
   receiving a third user input indicating a second data through a third user interface in a flat table format generated by a third user interface module; and
   generating a fourth user interface to display the second data in a hierarchical tree format, the fourth user interface generated by the second user interface module.

6. The method of claim 1, further comprising:
   retrieving the data from a first database; and
   retrieving the hierarchical relationship data associated with the data from a second database.

7. The method of claim 1, further comprising:
   mapping icons to hierarchy types to be displayed.

8. The method of claim 1, further comprising:
   determining a unique identifier of the data.

9. The method of claim 1, further comprising:
   displaying a legend in the second user interface.

10. A computer system comprising:
    a supply chain management application including a user interface module of the supply chain management application executed by a computer processor of the computer system, the user interface module of the supply chain management application to generate a supply chain management application user interface to display data including a plurality of data items having a hierarchical relationship in a flat table format and to provide access to services and functionality of the supply chain management application;
    a data provider module to retrieve hierarchical relationship data associated with the data, the hierarchical relationship data displayed in a flat table format separate from the display of the data in the supply chain management application user interface, the hierarchical relationship data stored in a data structure separate from the data; and
    a second user interface module separate and remote from the supply chain management application to generate hierarchical display of data for a plurality of applications, the second user interface module to generate a second user interface in response to user interaction with the supply chain management application user interface for navigating and manipulating the data displayed in the supply chain management application user interface, the second user interface to display the data including the plurality of data items having the hierarchical relationship in a hierarchical tree format having discrete levels in a window separate from and simultaneous with the supply chain management application user interface.

11. The computer system of claim 10, further comprising:
    an icon provider module to retrieve icons related to data to be displayed through the second user interface.

12. The computer system of claim 10, further comprising:
    a cursor positioning module to receive an indicator from the second user interface module, the indicator indicating a data item selected in the second user interface, the cursor positioning module to position a cursor in the supply chain management application user interface at a position corresponding to the data item selected in the second user interface.

13. The computer system of claim 10, further comprising:
a first database to store the data; and
a second database to store the hierarchical relationship data.

14. A non-transitory machine readable medium having a set of instructions stored therein which when executed cause a machine to perform a set of operations comprising:
displaying application data through a supply chain management application user interface of a supply chain management application, the supply chain management application user interface to display application data in a flat table format and to provide access to services and functionality of the supply chain management application;
retrieving hierarchical relationship data associated with the application data, the hierarchical relationship data displayed in a flat table format separate from the display of the application data in the supply chain management application user interface, the hierarchical relationship data stored in a data structure separate from the application data; and
displaying a second user interface generated by a second user interface module for navigating and manipulating the application data displayed in the supply chain management application user interface, the second user interface module being separate and remote from the supply chain management application to generate hierarchical display of data for a plurality of applications, the second user interface displayed in response to user interaction with the supply chain management application user interface, the second user interface to display the application data in a hierarchical tree format having discrete levels in a window separate from and simultaneous with the supply chain management application user interface.

15. The non-transitory machine readable medium of claim 14, having a further set of instructions stored therein which when executed cause a machine to perform a set of operations further comprising:
determining icons to be displayed in the second user interface based on data type.

16. The non-transitory machine readable medium of claim 14, having a further set of instructions stored therein which when executed cause a machine to perform a set of operations further comprising:
positioning a cursor in the supply chain management application user interface in response to user interaction with the second user interface.

17. The non-transitory machine readable medium of claim 14, having a further set of instruction stored therein which when executed cause a machine to perform a set of operations further comprising:
determining the application data associated with the user interaction;
retrieving the application data from a first database;
determining the hierarchical relationship data associated with the user interaction; and
retrieving the hierarchical relationship data from a second database.

18. The non-transitory machine readable medium of claim 14, having a further set of instructions stored therein which when executed cause a machine to perform a set of operations further comprising:
displaying a result of a modification of data in the second user interface in the supply chain management application user interface automatically.

* * * * *